REMOTE CONTROL MIRROR AND CONTROL MECHANISM THEREFORE

DESCRIPTION OF THE PRIOR ART

The remote control mechanisms disclosed by the prior art for rear view mirrors and the like may be divided into two categories; the push-turn type, which requires only one control wire, and the multiple wire controls. The push-turn control mechanisms include a single control wire which is connected to the drive mechanism, normally in the rear view mirror housing or adjacent thereto. The wire is turned by a knob or button within the vehicle to adjust the mirror in one axis and pushed or pulled to adjust the mirror in the other axis. The turning of the wire within its sheath is however subject to failure, especially in cramped conditions, and is not considered satisfactory. Examples of push-turn devices shown by the prior art include the following U.S. Pat. Nos.:

| | |
|---|---|
| 3,411,372 | 3,253,509 |
| 3,403,579 | 3,251,233 |
| 3,390,588 | 2,614,437 |
| 3,325,239 | 2,573,127 |

The multiple wire control mechanisms for rear view mirrors shown by the prior art merely utilize two or more wires to individually adjust the mirror in the vertical and horizontal axes, duplicating the individual controls. An example of such a device is shown in U.S. Pat. No. 2,903,944.

SUMMARY OF THE INVENTION

The control mechanism for the remote control mirror of this invention is adapted to utilize a single control wire for adjusting the mirror in the vertical and horizontal axes merely by turning the control knob, eliminating the relatively complex push-turn adjustment. Further, the wire is not turned or rotated in the sheath during adjustment of the mirror, but is shifted axially, thereby eliminating the problem of binding in the sheath. In the preferred embodiment of this invention, the mirror is adjusted in a predetermined spiral path, with each revolution of the control knob, adjusting the mirror in a greater arc or angle of inclination relative to an axis perpendicular to the reflective surface.

The control mechanism of this invention includes a pivotally supported mirror member having a generally planar reflective surface, a rotatable linkage system and a drive mechanism. The linkage system is adapted to adjustably tilt the mirror member as it is rotated and includes at least two pivotally connected, angularly connected link members. The first link member is operably connected to the mirror member at a fixed acute angle to the reflective surface, such that the mirror member is tilted in response to rotation of the first link member about an axis perpendicular to the reflective surface, defining a right angled cone in revolution. The second link member is pivotally and drivably connected to the first link member at one end and to the drive mechanism at the opposite end. The drive mechanism is adapted to rotate the linkage system, thereby tilting the mirror relative to the horizontal and vertical axes.

In the preferred embodiment of the control mechanism of this invention, the drive mechanism is adapted to shift the end of the second link member toward the mirror as the linkage system is rotated, thereby reducing the angle defined between the link members and increasing the angle of inclination of the mirror. The mirror member will thereby define a spiral path as it is adjusted, with the angle of inclination relative to an axis perpendicular to the reflective surface changing with each revolution of the link system. It will be understood that the mirror member would define a right angled cone if the link were not shifted as described.

In the disclosed embodiment, the second link member is shifted by a differential screw mechanism which increases the rate of movement as the end of the link member is shifted toward the mirror, providing a relatively fine adjustment for the mirror at relatively small angles of inclination and a relatively coarse adjustment at the larger angles. In one of the disclosed embodiments, the drive mechanism includes a gear rack which engages a pinion rotatably driving the linkage system. In the other embodiment, the control wire is received on a rotatably mounted spool which drives the linkage system. Other advantages and meritorious features will more fully appear from the following brief description of the drawings, description of the preferred embodiment and claims.

BRIEF DESCRIPTION OF THE DRAWINGS

FIG. 1 is a side elevation, partially cross sectioned, of the remote control mirror of this invention;

FIG. 2 is an enlarged partially cross sectioned side view of the control mechanism of the remote control mirror shown in FIG. 1;

FIG. 3 is a top elevation of a portion of the control mechanism shown in FIG. 2;

FIG. 4 is a cross sectional view of the control mechanism shown in FIG. 2, in the direction of view arrows 4—4;

FIG. 5 is a cross sectional view of the remote control mirror shown in FIG. 1, in the direction of view arrows 5—5;

FIG. 6 is a cross sectional view of the remote control mirror shown in FIG. 1, in the direction of view arrows 6—6;

FIG. 7 is a cross sectional view of the remote control mirror shown in FIG. 1 in the direction of view arrows 7—7;

FIG. 8 is a partially cross sectioned end view of the adjustment control shown in FIG. 1 in the direction of view arrows 8—8;

FIG. 9 is an end view of the control knob shown in FIG. 1;

FIGS. 10 and 11 graphically illustrate the movement of the mirror of the remote control mirror of this invention;

FIG. 12 is a partially cross sectioned side elevation of another embodiment of the remote control mirror of this invention; and FIG. 13 is a cross sectional view of the embodiment shown in FIG. 12 in the direction of view arrows 13—13.

DESCRIPTION OF THE PREFERRED EMBODIMENTS

The embodiment of the remote control mirror shown in FIGS. 1 to 9 includes an integral housing 20, a mirror member 22 having a generally planar reflective surface 24, a linkage means or system indicated generally at 26, a drive mechanism indicated at 28 and a remote control means shown at 30. The housing may be integrally formed from various materials including plastic, and includes a base portion 32 adapted to secure the remote control mirror to a vehicle panel or the like, an enclosure portion 34 adapted to receive the mirror member 22 and a mirror support portion 36. A bearing support member 38 is secured within the housing to the support portion 36, such as by plastic bonding or the like. The bearing support member is preferably formed of a friction resistant plastic material, such as nylon or Delrin, because it is adapted to bearingly support the mirror member.

The mirror member 22 includes a semispherical bearing portion 40 which is bearingly received in a spherically shaped socket 42 provided in the bearing support 38, as shown in FIG. 1. The mirror member in this embodiment is retained in the spherical socket 42 by three springs 44 which also limit rotation of the mirror member. Hooks 46 and 48 may be cast or molded in the enclosure portion 34 and mirror member 22, respectively, to retain the springs 44 as shown.

The linkage system 26 includes at least two pivotally secured, angularly related link members 50 and 52, as best shown in FIGS. 2 and 3. The first link member 50, in this embodiment of the invention, includes a pin-shaped end portion 54 which is rotatably received in the semispherical bearing portion 40 of the mirror member, and defines a fixed acute angle to the reflective surface 24 of the mirror member. The second link member 52 is drivably and pivotally connected to the first link member by a clevis 56, as best shown in FIG. 3. The end of the first link member is bifurcated to receive the end of the second link member, which is pivotally secured by a PATENTED MAY 2 1972
3,659,478
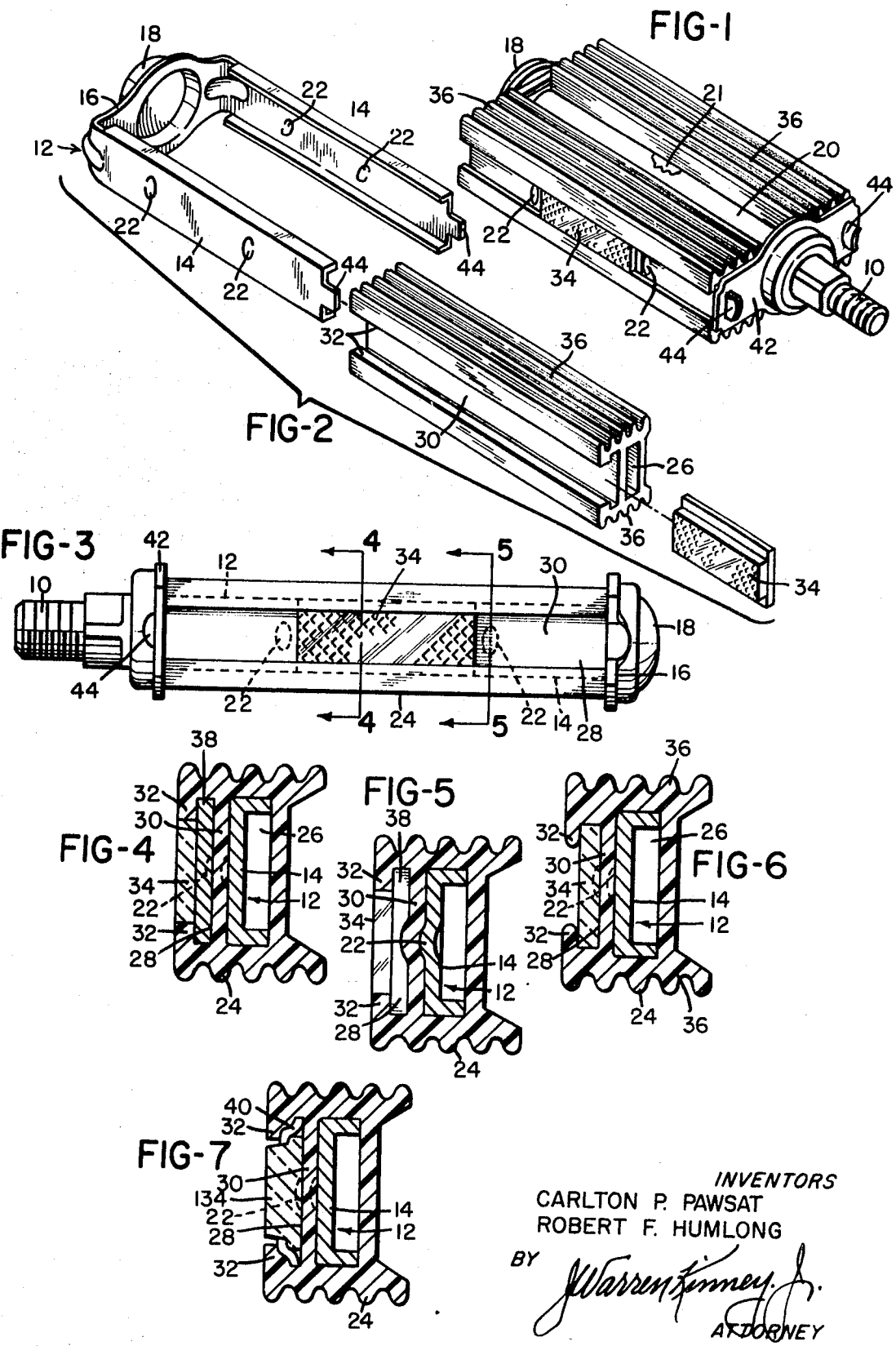
INVENTORS
CARLTON P. PAWSAT
ROBERT F. HUMLONG
BY J. Warren Kinney Jr.
ATTORNEY

REFLECTOR PEDAL FOR CYCLES

This invention relates to a reflector pedal for use on bicycles and other cycles, for the purpose of minimizing night-time collisions of other vehicles with pedal-propelled cycles. Such collisions usually have resulted from the inability of vehicle drivers to see the cyclist on the roadway due to inadequate lighting.

In accordance with the present invention, each bicycle pedal is equipped with a reflector of light, so that the light from vehicles following or approaching the bicycle will be reflected to the eye of the vehicle driver. The reflectors associated with the pedals will be visible whether or not the cyclist is pedaling or coasting, so long as his feet remain normally upon the pedals. During pedaling, the reflected light will have the appearance of colored bars or lines of light moving in a vertical plane. Even when the cyclist is coasting, sufficient animation of the pedal reflectors results from the natural ankle movements of the cyclist, to ensure attracting the attention of a vehicle driver.

Accordingly, it is an object of the present invention to provide highly effective means associated with the pedals of bicycles and the like, for reflecting light both forwardly and rearwardly of the line of travel of the cycle, the light emanating from an external source.

Another object of the invention is to provide an improved yet simplified reflective pedal for cycles, which will deliver prolonged service under all conditions of use, including adverse conditions involving dust, dirt, moisture and other foreign substances.

Another object is to provide a reflective pedal of the character referred to, which is simple and inexpensive to manufacture and assemble.

A further object of the invention is to provide such a reflective pedal, which embodies the virtues of extensive durability, serviceability, and pleasing appearance.

The foregoing and other objects are attained by the means described herein and illustrated upon the accompanying drawing, in which:

FIG. 1 is a perspective view of the improved reflective pedal of the present invention.

FIG. 2 is an exploded perspective view of certain details of the pedal construction.

FIG. 3 is a side elevation of the pedal shown in FIG. 1.

FIG. 4 is an enlarged cross-section taken on line 4—4 of FIG. 3.

FIG. 5 is an enlarged cross-section taken on line 5—5 of FIG. 3.

FIG. 6 is a view similar to FIG. 4, showing a modification.

FIG. 7 is a view similar to FIG. 4, showing a second modification.

Throughout this disclosure, the terms "bicycle" and "cycle" shall be construed to include unicycles, bicycles, tricycles, and all other forms of vehicles which are pedal-propelled. The pedal may include the usual threaded stud 10, or any other appropriate means, for effective mounting of the pedal upon a crank, hanger, or other propulsion member of the cycle or vehicle. As usual, the body of the pedal is adapted to rotate about the axis of stud 10.

The pedal may comprise a frame member 12 which preferably is substantially U-shaped in general form, having a pair of spaced parallel legs 14, 14 and a connecting base portion 16. The base portion 16 may be suitably embossed as at 18, or otherwise adapted to accommodate a bearing within which the pedal may rotate about the axis of stud 10. The numeral 20 indicates a sleeve coaxial with stud 10 and the usual axle 21, which may be integral with stud 10 and the usual axle 21, which may be integral with stud 10 and arranged to support suitable pedal bearings in conventional manner.

The frame legs 14, 14 may be of durable rigid metal, and may be reinforced or rigidified by making them channel-shaped in cross-section, along with the base portion 16, as clearly represented upon FIG. 2. Each leg 14 may be provided with a pair of spaced outwardly projected pimples or detents 22,22 which are to serve as reflector retainers, these to be more fully described hereinafter.

The reference numeral 24 indicates a pedal block or tread member, of which two are incorporated in a pedal, and such blocks or tread members may be formed of any suitable wear-resistant frictional material such as rubber or the like, or a plastic material having the required characteristics. The pedal block or tread member preferably is a plastic extrusion easily and inexpensively formed in long lengths, and cut off as required for use in various sizes and types of pedals.

In cross-sectional shape, each block or tread member 24 includes an elongate tubular passageway 26 open at opposite ends to receive a leg 14 of the frame member 12. Coextensive with the passageway 26, and parallel thereto, is an open-face channel 28 defined by a substantially flat partition or back wall 30 and a pair of oppositely and inwardly directed elongate lips or flanges 32, 32, said lips or flanges being spaced from one another and from back wall 30. The lips or flanges lie in a common plane which is parallel to but spaced from wall 30. The opposed lips or flanges 32, 32 serve as guides and retaining means for a reflector element 34 slidingly inserted into channel 28 at one end thereof, said channel being open at its opposite ends as shown.

The material of which the pedal block or tread member is formed should possess a measure of resiliency and/or flexibility, and opposite faces thereof will preferably carry external treads or serrations, as at 36, 36. The reflector element, in one form or another, is mounted on the block or tread member by sliding it endwise into channel 28 past one of the pimples 22, until the reflector element rests between the two spaced pimples. Pimples 22, 22 of course do not directly contact the reflector element, because the partition wall 30 is located between the pimples and the reflector element; however, the resilient or flexible material of wall 30 will be distorted in an outward direction by the pimples, thereby to form secondary pimples in channel 28 to restrain the reflector element against easy endwise displacement from a normal position between the pimples.

As FIG. 6 clearly indicates, the lips or flanges 32,32 embrace opposite side margins of the reflector element 34, while at the same time yieldingly pressing the rear face of the reflector element firmly into flatwise contact with the outer face of wall 30. Such mounting of the reflector element precludes entry and deposit of dirt, dust and moisture between the reflector element and wall 30, thereby preserving the initial brilliancy of the element.

In the FIG. 4 variation, the reflector element 34 is permanently attached to a flat base plate 38 having opposite side margins embraced by the lips or flanges 32, 32. In this case, the reflector element may be dimensioned to approximately fit the space between the lips or flanges as shown. the base plate 38 is wider, and may be simply a flat strip of metal, plastic, or other appropriate material to which the reflector element 34 may be attached by adhesion, electronic welding, or other method effective to seal the rear face of the component 34 against exposure to dirt, moisture and other elements of nature which might diminish the brilliancy thereof. Preferably, though not necessarily, the lips 32, 32 in FIG. 4 snugly abut the upper and lower edges of element 34.

In both the FIG. 4 and the FIG. 6 construction, the reflector element or some constituent part thereof is restrained against endwise displacement within channel 28, as by means of the pimples or detents 22, 22 (FIG. 3).

In FIG. 7, the reflector element is denoted 134, and may be in the form of a reflective button surrounded by a metallic bezel or frame 40 firmly supporting the button. In this instance the bezel or frame 40 is embraced by the flanges or lips 32,32, leaving the button exposed between the flanges 32, 32. The bezel or frame 40 may be of any appropriate material or shape so long as it is subject to embrace by the flange or lips 32, 32; and any desired number of reflector elements 134 may be applied to the bezel or frame. The elements 134 may be of any desired shape or contour, and may or may not be backed by a protective sheet, film or coating to preserve its reflective quality.

It may here be noted that channel 28 may accommodate more than one reflector element if desired; moreover, the entire length of channel 28 might be rendered reflective by inserting reflector elements in adequate sizes or numbers.

To assemble the pedal structure, two pedal blocks or tread members 24 are fitted with reflector elements as above explained, whereupon one is slidingly applied to each leg 14 of the pedal frame assembly with the legs snugly received in the tubular passageways 26. With proper application, an end of each pedal block will abut the connecting portion 16 of the pedal frame, and the reflector elements 34 will each assume a position between pimples or detents 22, 22 of each leg. The reflector elements, if necessary, may be manually shifted into proper position between the pimples or detents.

Following application of the members 24, there will be applied to the free ends of legs 14, 14, a cross bar or end plate 42 which maintains the legs in spaced parallelism and supports the threaded stud 10. The cross bar or end plate 42 may be fixed to the free ends of legs 14, 14 in any suitable manner, although in the example shown, the connection is effected by means of bendable tangs 44, 44 on the legs being projected through slots in the cross bar, and then bent over or mutilated to secure the assembly. The nature of the connection here mentioned is immaterial to the present invention, but details thereof may be obtained by reference to the issued patent of Golden et al, U.S. Pat. No. 3,186,254, and dated June 1, 1965, which patent discloses also an acceptable bearing arrangement for the pedal shaft.

It may here be noted that the present invention is fully applicable as an improvement, to the pedal of the Golden et al. patent as well as to other pedals known in the industry and in the art related thereto.

The pimples or detents 22,22 may conveniently be formed in the legs 14 by punching or pressing, or if desired, they may be supplied by other methods. Should it be considered desirable to extend the reflector throughout the length of the tread member or pedal block 24, the pimples or detents may be considered unnecessary elements, and may therefore be omitted. The reflectors may be formed of acrylic plastic or equivalent materials, including glass.

What is claimed is:

1. A pedal comprising: a pedal frame including a pair of spaced parallel elongate legs of equal length each having a free end and having outwardly extending spaced apart protuberances thereon; a pair of elongate pedal blocks substantially coextensive in length with the length of the legs, said pedal blocks each having an elongate tubular passageway therethrough receptive of one of said legs and a channel in one side of each block parallel to and coextensive with said passageway and separated therefrom by a dividing wall having a substantially flat outer face, said channel being defined by said dividing wall and a pair of elongate, oppositely and inwardly directed retainer flanges resting in a plane parallel to and equally spaced from said dividing wall, said retainer flanges terminating at their inner edges spaced from one another to define an opening to said channel, the channel terminating in open ends through the opposite ends of said pedal block; the pedal blocks being of a flexible and resilient material, the dividing wall being outwardly distorted by the protuberances, a reflector element slidably inserted into an open end of each channel and having a configuration such as to be received behind said flanges and held therein by said flanges; the protuberances being spaced apart a distance slightly greater than the major dimension of the reflector element, the protuberances obstructing shifting lengthwise of the reflector element in the channel, and means for rotationally mounting said pedal frame upon a crank arm.

2. A pedal as defined by claim 1, wherein said retainer flanges are spaced from the outer face of the dividing wall a distance substantially equal to the thickness of the reflector element so as to maintain the back of the reflector element in flatwise abutment against the substantially flat outer face of the dividing wall.

3. A pedal as defined by claim 1, wherein is included a flat base plate upon which the reflector element is mounted in flatwise contact therewith, said base plate having marginal side portions embraced by said channel flanges.

4. A pedal as defined by claim 1, wherein is included a bezel member upon which the reflector element is mounted, said bezel member including marginal portions embraced by said channel flanges.

5. A pedal as defined by claim 3, wherein one dimension of the reflector element is approximately equal to the space between the retainer flanges.

6. A pedal as defined by claim 1, wherein the reflector element is formed of a material of the class of acrylic plastic.

* * * * *